US011503602B2

(12) United States Patent
Suzuki et al.

(10) Patent No.: US 11,503,602 B2
(45) Date of Patent: Nov. 15, 2022

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Shouichi Suzuki, Sakai (JP); Tomoki Yoshimura, Sakai (JP); Wataru Ohuchi, Sakai (JP); Liqing Liu, Sakai (JP); Taewoo Lee, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 22 days.

(21) Appl. No.: 16/967,760

(22) PCT Filed: Feb. 8, 2019

(86) PCT No.: PCT/JP2019/004669
§ 371 (c)(1),
(2) Date: Aug. 6, 2020

(87) PCT Pub. No.: WO2019/156224
PCT Pub. Date: Aug. 15, 2019

(65) Prior Publication Data
US 2020/0367249 A1    Nov. 19, 2020

(30) Foreign Application Priority Data

Feb. 8, 2018    (JP) .............................. JP2018-020774

(51) Int. Cl.
*H04W 72/04*    (2009.01)
*H04W 76/11*    (2018.01)
*H04W 80/08*    (2009.01)

(52) U.S. Cl.
CPC ..... *H04W 72/0466* (2013.01); *H04W 72/042* (2013.01); *H04W 76/11* (2018.02); *H04W 80/08* (2013.01)

(58) Field of Classification Search
CPC ............. H04W 72/0466; H04W 76/11; H04W 72/042; H04W 80/08; H04W 88/02;
(Continued)

(56) References Cited

U.S. PATENT DOCUMENTS 10,075,334 B1 * 9/2018 Kozura ............... H04W 12/086
2009/0077623 A1 * 3/2009 Baum ................. H04L 12/2818
726/1

(Continued)

OTHER PUBLICATIONS

NTT Docomo, Inc., "Summary of discussions for AI 7.3.1.1 PDCCH structure", 3GPP TSG RAN WG1 Meeting AH 1801, R1-1801064, Jan. 22-26, 2018, pp. 1-12.
(Continued)

*Primary Examiner* — Ayaz R Sheikh
*Assistant Examiner* — Tarell A Hampton
(74) *Attorney, Agent, or Firm* — Keating & Bennett, LLP

(57) ABSTRACT

Efficient downlink transmission is implemented. A terminal apparatus includes: a receiver configured to receive a sequence of bits in a physical downlink control channel, wherein the sequence of bits is scrambled with a scrambling sequence initialized by $c_{init}$, the $c_{init}$ is given based at least on $N_{ID}$ and $N_{RNTI}$, the $N_{ID}$ is given based at least on a higher layer parameter Control-scrambling-Identity in a case that the higher layer parameter Control-scrambling-Identity is configured and the $N_{RNTI}$ is given based at least on a Cell-Radio Network Temporary Identifier (C-RNTI), and the $N_{ID}$ is given based at least on a physical layer cell identity in a case that the higher layer parameter Control-scrambling-Identity is configured and the $N_{RNTI}$ is not given based on the C-RNTI.

4 Claims, 9 Drawing Sheets

(58) Field of Classification Search
CPC .............. H04W 88/08; H04L 27/2602; H04L 25/03866; H04L 5/0016; H04L 5/003; H04L 5/0053; H04L 27/26
See application file for complete search history.

(56) References Cited

U.S. PATENT DOCUMENTS

| | | | | |
|---|---|---|---|---|
| 2009/0082888 A1* | 3/2009 | Johansen | .............. | H04L 65/607 700/94 |
| 2010/0023865 A1* | 1/2010 | Fulker | ................... | H04L 67/025 715/734 |
| 2013/0314244 A1* | 11/2013 | Hershberger | ........ | B67D 1/0888 340/870.02 |
| 2016/0182482 A1* | 6/2016 | Koo | ......................... | G07C 9/27 726/7 |
| 2016/0233946 A1* | 8/2016 | Wengrovitz | ......... | G05D 1/0011 |
| 2016/0241660 A1* | 8/2016 | Nhu | ........................ | H04L 67/04 |
| 2017/0063967 A1* | 3/2017 | Kitchen | ................... | H04L 67/02 |

OTHER PUBLICATIONS

Official Communication issued in International Patent Application No. PCT/JP2019/004669, dated Apr. 23, 2019.

"3rd Generation Partnership Project; Technical Specification Group Radio Access Network; NR; Physical channels and modulation (Release 15)", 3GPP TS 38.211 V15.0.0, Dec. 2017, pp. 1-73.
"3rd Generation Partnership Project; Technical Specification Group Radio Access Network; NR; Multiplexing and channel coding (Release 15)", 3GPP TS 38.212 V15.0.0, Dec. 2017, 1-82.
"3rd Generation Partnership Project; Technical Specification Group Radio Access Network; NR; Physical layer procedures for control (Release 15)", 3GPP TS 38.213 V15.0.0, Dec. 2017, pp. 1-56.
"3rd Generation Partnership Project; Technical Specification Group Radio Access Network; NR; Physical layer procedures for data (Release 15)", 3GPP TS 38.214 V15.0.0, Dec. 2017, pp. 1-71.
"3rd Generation Partnership Project; Technical Specification Group Radio Access Network; NR; Medium Access Control (MAC) protocol specification (Release 15)", 3GPP TS 38.321 V15.0.0, Dec. 2017, 1-55.
Ericsson, "On PDCCH structure", 3GPP TSG-RAN WG1AH-1801, R1-1800943, Jan. 22-26, 2018, 7 pages.
NTT Docomo, Inc., "Offline discussion for PDCCH structure", 3GPP TSG RAN WG1 NR Ad Hoc Meeting, R1-1801196, Jan. 22-26, 2018, pp. 1-2.
Ericsson, "draftCR to 38.211 capturing the Jan. 18 ad-hoc meeting agreements", 3GPP TSG-RAN1 Meeting AH18-01, R1-1801283, Jan. 22-26, 2018, 76 pages.

* cited by examiner

BASE STATION 3

TERMINAL
APPARATUS 1

TERMINAL APPARATUS, BASE STATION APPARATUS, AND COMMUNICATION METHOD

TECHNICAL FIELD

The present invention relates to a terminal apparatus, a base station apparatus, and a communication method. This application claims the benefit of priority to JP 2018-020774 filed on Feb. 8, 2018, which is incorporated herein by reference in its entirety.

BACKGROUND ART

A radio access method and a radio network for cellular mobile communications (hereinafter referred to as "Long Term Evolution (LTE: Registered Trademark)", or "Evolved Universal Terrestrial Radio Access (EUTRA)") have been studied in the 3rd Generation Partnership Project (3GPP) (NPLs 1, 2, 3, 4, and 5). In 3GPP, a new radio access method (hereinafter referred to as "New Radio (NR)") has been studied. In LTE, a base station apparatus is also referred to as an evolved NodeB (eNodeB). In NR, a base station apparatus is also referred to as a gNodeB. In LTE, and in NR, a terminal apparatus is also referred to as a User Equipment (UE). LTE, as well as NR, is a cellular communication system in which multiple areas are deployed in a cellular structure, with each of the multiple areas being covered by a base station apparatus. A single base station apparatus may manage multiple cells.

A PDCCH is used in the downlink of NR (NPLs 1, 2, 3, 4, 5). NPLs 6 and 7 describe initialization of a scrambling sequence generation unit for PDCCH scrambling by using $n_{RNTI}$ and $n_{ID}$.

CITATION LIST

Non Patent Literature

NPL 1: "3GPP TS 38.211 V15.0.0 (2017-12), NR; Physical channels and modulation", 3 Jan. 2018.
NPL 2: "3GPP TS 38.212 V15.0.0 (2017-12), NR; Multiplexing and channel coding", 3 Jan. 2018.
NPL 3: "3GPP TS 38.213 V15.0.0 (2017-12), NR; Physical layer procedures for control", 3 Jan. 2018.
NPL 4: "3GPP TS 38.214 V15.0.0 (2017-12), NR; Physical layer procedures for data", 3 Jan. 2018.
NPL 5: "3GPP TS 38.321 V15.0.0 (2017-12), NR; Medium Access Control (MAC) protocol specification", 4 Jan. 2018.
NPL 6: "On PDCCH structure", R1-1800943, Ericsson, 3GPP TSG-RAN WG1AH-1801, Vancouver, Canada, 22-26 Jan. 2018.
NPL 7: "Offline discussion for PDCCH structure", R1-1801196, NTT DOCOMO, INC., 3GPP TSG-RAN WG1 AH-1801, Vancouver, Canada, 22-26 Jan. 2018.

SUMMARY OF INVENTION

Technical Problem

An aspect of the present invention provides a terminal apparatus, a communication method used for the terminal apparatus, a base station apparatus, and a communication method used for the base station apparatus. In an aspect of the present invention, a terminal apparatus, a communication method used for the terminal apparatus, a base station apparatus, and a communication method used for the base station apparatus include a method for efficiently performing transmission and/or reception of the downlink.

Solution to Problem (1) According to some aspects of the present invention, the following measures are provided. Specifically, a first aspect of the present invention is a terminal apparatus including: a receiver configured to receive a sequence of bits in a physical downlink control channel, wherein the sequence of bits is scrambled with a scrambling sequence initialized by $c_{init}$, the $c_{init}$ is given based at least on $N_{ID}$ and $N_{RNTI}$, the $N_{ID}$ is given based at least on a higher layer parameter Control-scrambling-Identity in a case that the higher layer parameter Control-scrambling-Identity is configured and the $N_{RNTI}$ is given based at least on a Cell-Radio Network Temporary Identifier (C-RNTI), and the $N_{ID}$ is given based at least on a physical layer cell identity in a case that the higher layer parameter Control-scrambling-Identity is configured and the $N_{RNTI}$ is not given based on the C-RNTI.

(2) A second aspect of the present invention is a base station apparatus including: a transmitter configured to transmit a sequence of bits in a physical downlink control channel, wherein the sequence of bits is scrambled with a scrambling sequence initialized by $c_{init}$, the $c_{init}$ is given based at least on $N_{ID}$ and $N_{RNTI}$, the $N_{ID}$ is given based at least on a higher layer parameter Control-scrambling-Identity in a case that the higher layer parameter Control-scrambling-Identity is configured and the $N_{RNTI}$ is given based at least on a Cell-Radio Network Temporary Identifier (C-RNTI), and the $N_{ID}$ is given based at least on a physical layer cell identity in a case that the higher layer parameter Control-scrambling-Identity is configured and the $N_{RNTI}$ is not given based on the C-RNTI.

(3) A third aspect of the present invention is a communication method used for a terminal apparatus, the communication method including the step of: receiving a sequence of bits in a physical downlink control channel, wherein the sequence of bits is scrambled with a scrambling sequence initialized by $c_{init}$, the $c_{init}$ is given based at least on $N_{ID}$ and $N_{RNTI}$, the $N_{ID}$ is given based at least on a higher layer parameter Control-scrambling-Identity in a case that the higher layer parameter Control-scrambling-Identity is configured and the $N_{RNTI}$ is given based at least on a Cell-Radio Network Temporary Identifier (C-RNTI), and the $N_{ID}$ is given based at least on a physical layer cell identity in a case that the higher layer parameter Control-scrambling-Identity is configured and the $N_{RNTI}$ is not given based on the C-RNTI.

(4) A fourth aspect of the present invention is a communication method used for a base station apparatus, the communication method including the step of: transmitting a sequence of bits in a physical downlink control channel, wherein the sequence of bits is scrambled with a scrambling sequence initialized by $c_{init}$, the $c_{init}$ is given based at least on $N_{ID}$ and $N_{RNTI}$, the $N_{ID}$ is given based at least on a higher layer parameter Control-scrambling-Identity in a case that the higher layer parameter Control-scrambling-Identity is configured and the $N_{RNTI}$ is given based at least on a Cell-Radio Network Temporary Identifier (C-RNTI), and the $N_{ID}$ is given based at least on a physical layer cell identity in a case that the higher layer parameter Control-scrambling-Identity is configured and the $N_{RNTI}$ is not given based on the C-RNTI.

Advantageous Effects of Invention

According to an aspect of the present invention, the terminal apparatus can efficiently perform reception of the downlink. The base station apparatus can efficiently perform transmission of the downlink.

DESCRIPTION OF EMBODIMENTS

Embodiments of the present invention will be described below.

Figure 1:
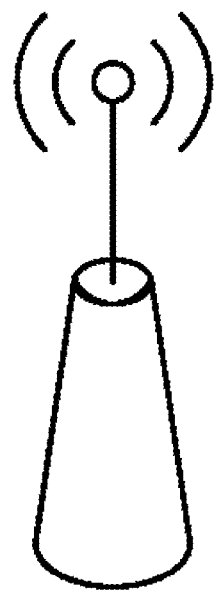
FIG. 1 is a conceptual diagram of a radio communication system according to the present embodiment.
Figure 1:
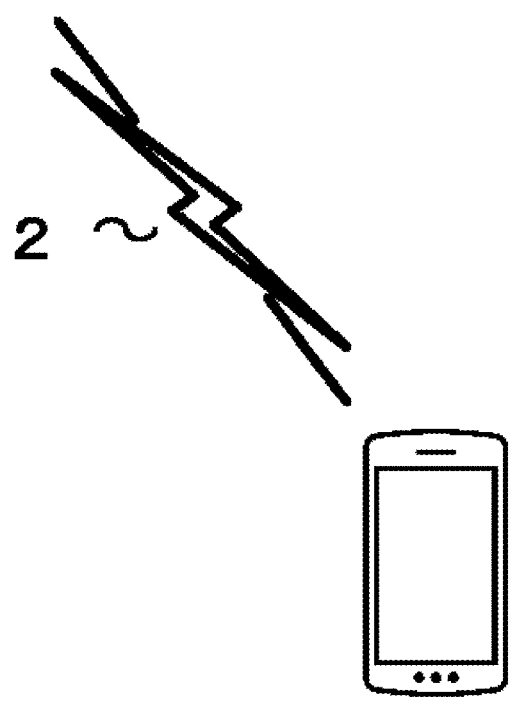

FIG. 1 is a conceptual diagram of a radio communication system according to the present embodiment. In FIG. 1, the radio communication system includes a terminal apparatus 1 and a base station apparatus 3.

Hereinafter, carrier aggregation will be described.

According to the present embodiment, one or multiple serving cells are configured for the terminal apparatus 1. A technology that allows the terminal apparatus 1 to perform communication via the multiple serving cells is referred to as cell aggregation or carrier aggregation. The present invention may be applied to each of the multiple serving cells configured for the terminal apparatus 1. The present invention may be applied to some of the multiple serving cells configured. The multiple serving cells include one primary cell or one primary secondary cell. Here, the multiple serving cells may include one or multiple secondary cells. The primary secondary cell is also referred to as a primary SCG cell. The primary cell and the primary SCG cell are also referred to as special cells.

The primary cell is a serving cell in which an initial connection establishment procedure has been performed, a serving cell in which a connection re-establishment procedure has been initiated, or a cell indicated as a primary cell in a handover procedure. The secondary cell may be configured at a point of time when or after a Radio Resource Control (RRC) connection is established.

A carrier corresponding to a serving cell in the downlink is referred to as a downlink component carrier. A carrier corresponding to a serving cell in the uplink is referred to as an uplink component carrier. A downlink component carrier and an uplink component carrier are collectively referred to as a component carrier.

The terminal apparatus 1 can perform simultaneous transmission and/or reception on multiple physical channels in multiple serving cells (component carriers). A single physical channel is transmitted in a single serving cell (component carrier) out of the multiple serving cells (component carriers).

Physical channels and physical signals according to the present embodiment will be described.

In uplink radio communication from the terminal apparatus 1 to the base station apparatus 3, the following uplink physical channels are used. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used for transmitting CSI (Channel State Information) of downlink and/or HARQ-ACK (Hybrid Automatic Repeat reQuest). The CSI, as well as the HARQ-ACK, is Uplink Control Information (UCI).

The PUSCH is used for transmitting uplink data (Transport block, Uplink-Shared Channel (UL-SCH)), the CSI of downlink, and/or the HARQ-ACK. The CSI, as well as the HARQ-ACK, is Uplink Control Information (UCI). The terminal apparatus 1 may transmit the PUSCH, based on detection of the Physical Downlink Control Channel (PDCCH) including an uplink grant.

The PRACH is used to transmit a random access preamble.

The following uplink physical signal is used in the uplink radio communication. The uplink physical signal is not used for transmitting information output from the higher layer, but is used by the physical layer.

Demodulation Reference Signal (DMRS)

The DMRS relates to transmission of the PUSCH or the PUCCH. The DMRS may be time-multiplexed with the PUSCH. The base station apparatus 3 may use the DMRS in order to perform channel compensation of the PUSCH.

The following downlink physical channels are used for downlink radio communication from the base station apparatus 3 to the terminal apparatus 1. The downlink physical channels are used for transmitting information output from the higher layer.

Physical Broadcast Channel (PBCH)
Physical Downlink Control Channel (PDCCH)
Physical Downlink Control Channel (PDSCH)

The PBCH is used to transmit system information. The system information transmitted on the PBCH is also referred to as a Master Information Block (MIB).

The PDCCH is used to transmit Downlink Control Information (DCI). The downlink control information is also referred to as DCI format. The downlink control information includes an uplink grant and a downlink assignment. The uplink grant may be used for scheduling of a single PUSCH in a single cell. The uplink grant may be used for scheduling multiple PUSCHs in multiple slots in a single cell. The uplink grant may be used for scheduling a single PUSCH in multiple slots in a single cell.

The PDSCH is used to transmit downlink data (Transport block, Downlink-Shared Channel (DL-SCH)).

The UL-SCH and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU).

A configuration of the radio frame according to the present embodiment will be described below.

Figure 2:
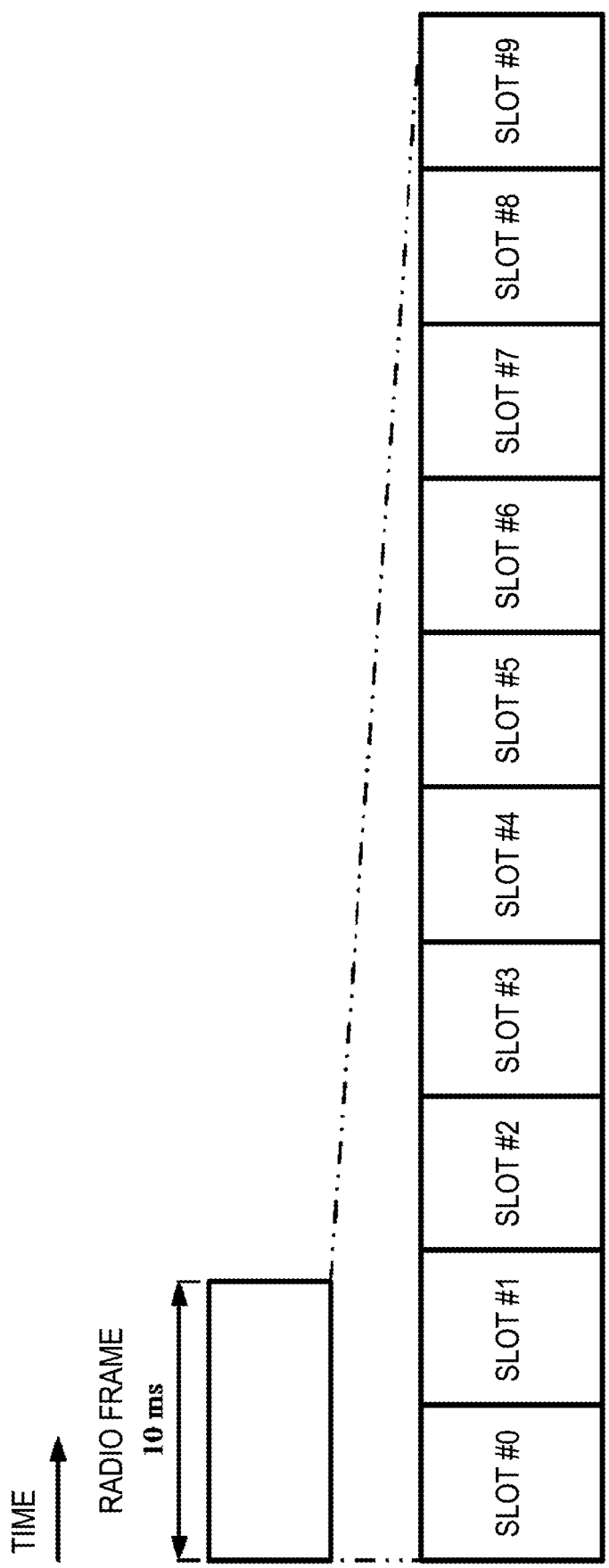
FIG. 2 is a diagram illustrating a schematic configuration of a radio frame according to the present embodiment.

FIG. 2 is a diagram illustrating a schematic configuration of a radio frame according to the present embodiment. In FIG. 2, the horizontal axis is a time axis. Each of the radio frames may be 10 ms in length. Each of the radio frames may include ten slots. Each of the slots may be 1 ms in length.

Figure 3:
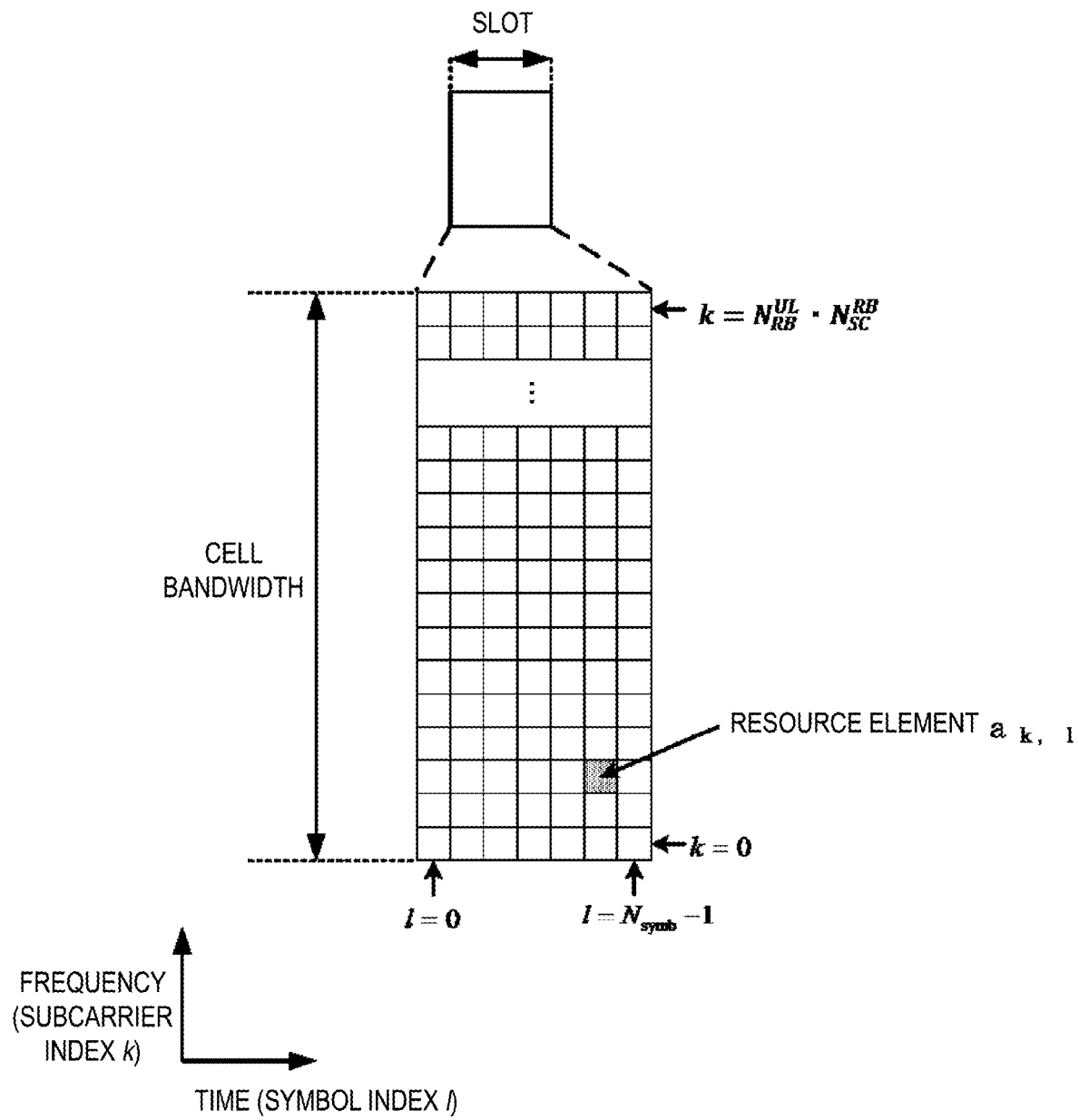
FIG. 3 is a diagram illustrating a schematic configuration of an uplink slot according to the present embodiment.

An example configuration of a slot according to the present embodiment will be described below. FIG. 3 is a diagram illustrating a schematic configuration of an uplink slot according to the present embodiment. FIG. 3 illustrates a configuration of an uplink slot in a single cell. In FIG. 3, the horizontal axis is a time axis, and the vertical axis is a frequency axis. The uplink slot may include $N_{symb}^{UL}$ OFDM symbols.

In FIG. 3, l is an OFDM symbol number/index, and k is a subcarrier number/index. The physical signal or the physical channel transmitted in each of the slots is represented by a resource grid. In the uplink, the resource grid is defined by multiple subcarriers and multiple OFDM symbols. Each element in the resource grid is referred to as a resource element. The resource element is represented by a subcarrier number/index k and an OFDM symbol number/index l.

The uplink slot includes the multiple OFDM symbols l (l=0, 1, ..., $N_{symb}^{UL}$) in the time domain. For a normal Cyclic Prefix (CP) in the uplink, $N_{symb}^{UL}$ may be 7 or 14. For an extended CP in the uplink, $N_{symb}^{UL}$ may be 6 or 12.

The terminal apparatus 1 receives the parameter UL-CyclicPrefixLength of the higher layer for indicating the CP length in the uplink from the base station apparatus 3. The base station apparatus 3 may broadcast, in the cell, system information including the parameter UL-CyclicPrefix-Length of the higher layer corresponding to the cell.

The uplink slot includes multiple subcarriers k (k=0, 1, ..., $N_{RB}^{UL}*N_{SC}^{RB}$) in the frequency domain. $N_{RBUL}$ is an uplink bandwidth configuration for the serving cell represented by a multiple of $N_{SC}^{RB}$. $N_{SC}^{RB}$ is a (physical) resource block size in the frequency domain and represented by the number of subcarriers. The subcarrier spacing Δf may be 15 kHz. The $N_{SC}^{RB}$ may be 12. The (physical) resource block size in the frequency domain may be 180 kHz.

One physical resource block is defined by $N_{symb}^{UL}$ continuous OFDM symbols in the time domain and by $N_{SC}^{RB}$ continuous subcarriers in the frequency domain. Hence, one physical resource block includes ($N_{symb}^{UL}*N_{SC}^{RB}$) resource elements. One physical resource block may correspond to one slot in the time domain. The physical resource blocks may be numbered $n_{PRB}$ (0, 1, ..., $N_{RB}^{UL}-1$) in an ascending order of frequencies in the frequency domain.

The downlink slot according to the present embodiment includes multiple OFDM symbols. Since the slot configuration of the downlink according to the present embodiment is basically the same as the slot configuration of the uplink, the description of the configuration of the downlink slot will be omitted.

Configurations of apparatuses according to the present embodiment will be described below.

Figure 4:
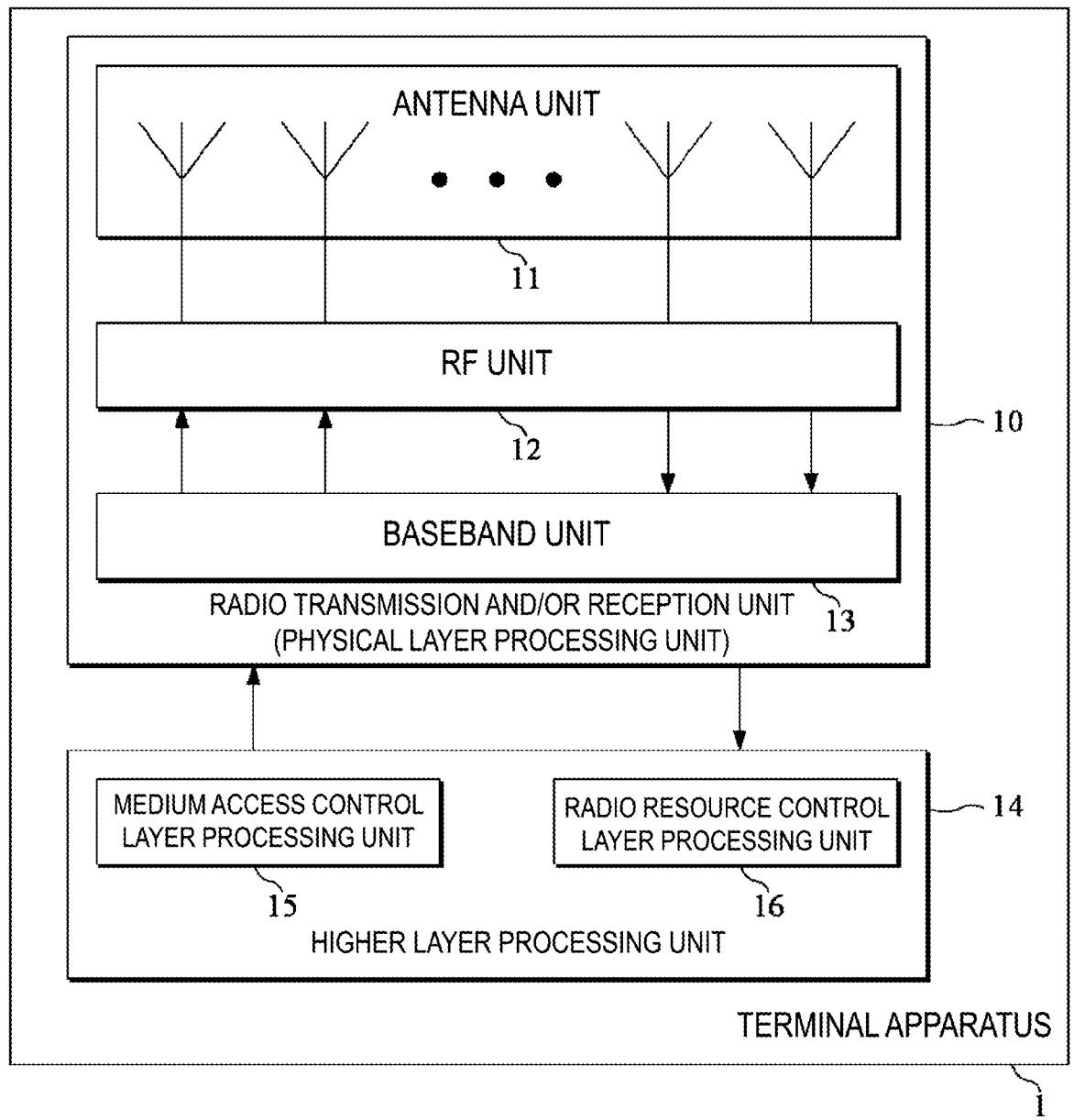
FIG. 4 is a schematic block diagram illustrating a configuration of a terminal apparatus 1 according to the present embodiment.

FIG. 4 is a schematic block diagram illustrating a configuration of the terminal apparatus 1 according to the present embodiment. As illustrated, the terminal apparatus 1 includes a radio transmission and/or reception unit 10 and a higher layer processing unit 14. The radio transmission and/or reception unit 10 includes an antenna unit 11, a Radio Frequency (RF) unit 12, and a baseband unit 13. The higher layer processing unit 14 includes a medium access control layer processing unit 15 and a radio resource control layer processing unit 16. The radio transmission and/or reception unit 10 is also referred to as a transmitter, a receiver, a coding unit, a decoding unit, or a physical layer processing unit.

The higher layer processing unit 14 outputs uplink data (transport block) generated by a user operation or the like, to the radio transmission and/or reception unit 10. The higher layer processing unit 14 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 15 included in the higher layer processing unit 14 performs processing of the medium access control layer. The medium access control layer processing unit 15 controls random access procedure in accordance with various types of configuration information/parameters managed by the radio resource control layer processing unit 16.

The radio resource control layer processing unit 16 included in the higher layer processing unit 14 performs processing of the radio resource control layer. The radio resource control layer processing unit 16 manages various types of configuration information/parameters of the terminal apparatus 1. The radio resource control layer processing unit 16 sets various types of configuration information/parameters, based on a higher layer signaling received from the base station apparatus 3. Namely, the radio resource control layer processing unit 16 sets the various configuration information/parameters in accordance with the information for indicating the various configuration information/parameters received from the base station apparatus 3.

The radio transmission and/or reception unit 10 performs processing of the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3.

The RF unit 12 converts (down converts) a signal received via the antenna unit 11 into a baseband signal by orthogonal demodulation and removes unnecessary frequency components. The RF unit 12 outputs a processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an SC-FDMA symbol by performing Inverse Fast Fourier Transform (IFFT) of the data, adds CP to the generated SC-FDMA symbol, generates a baseband digital signal, and converts the baseband digital signal into an analog signal. The baseband unit 13 outputs the converted analog signal to the RF unit 12.

The RF unit 12 removes unnecessary frequency components from the analog signal input from the baseband unit 13 by using a low-pass filter, up converts the analog signal into a signal of a carrier frequency, and transmits the up-converted signal via the antenna unit 11. The RF unit 12 amplifies power. The RF unit 12 may have a function of controlling transmit power. The RF unit 12 is also referred to as a transmit power control unit.

Figure 5:
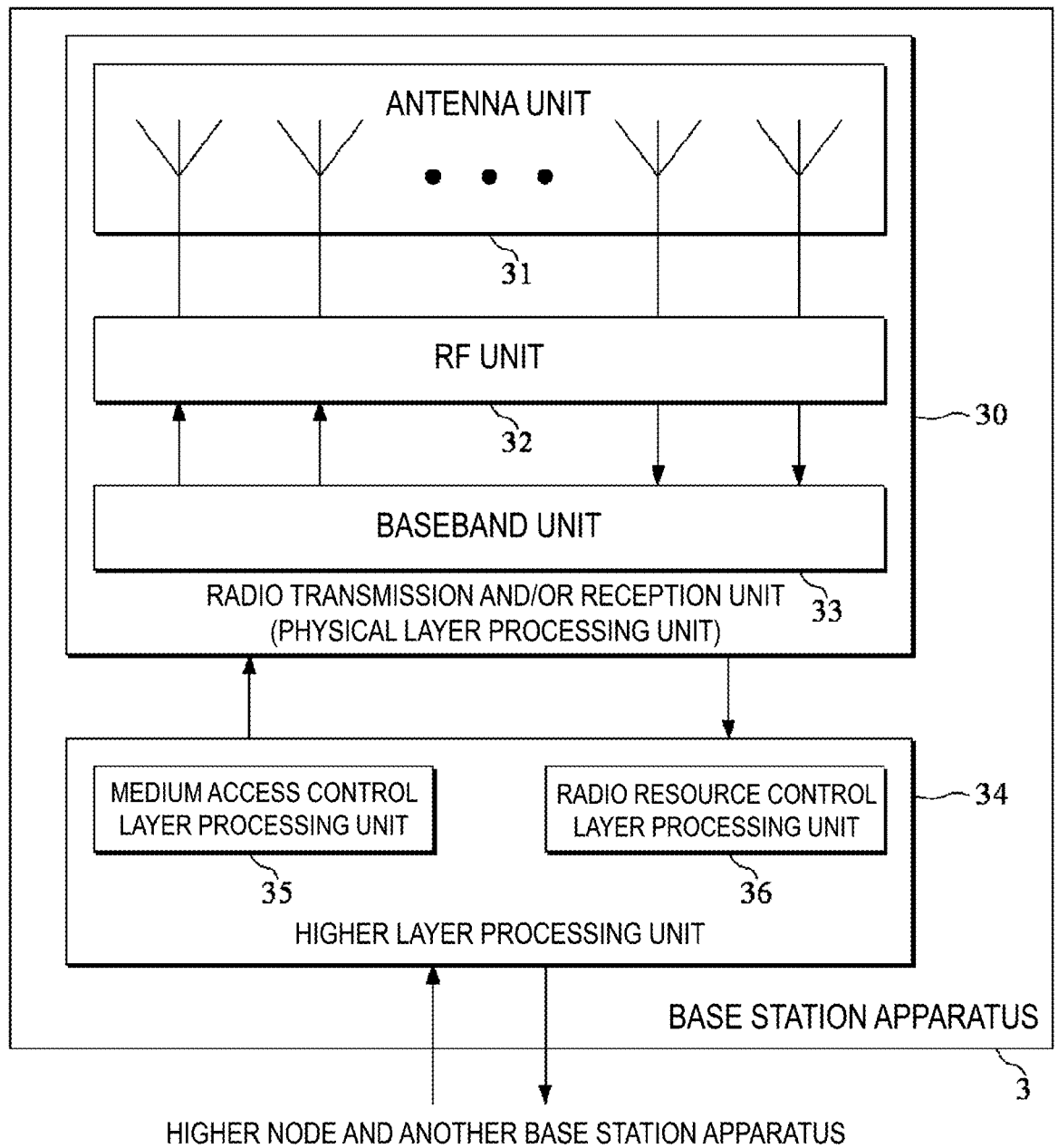
FIG. 5 is a schematic block diagram illustrating a configuration of a base station apparatus 3 according to the present embodiment.

FIG. 5 is a schematic block diagram illustrating a configuration of the base station apparatus 3 according to the present embodiment. As illustrated, the base station apparatus 3 includes a radio transmission and/or reception unit 30 and a higher layer processing unit 34. The radio transmission and/or reception unit 30 includes an antenna unit 31, an RF unit 32, and a baseband unit 33. The higher layer processing unit 34 includes a medium access control layer processing unit 35 and a radio resource control layer processing unit 36. The radio transmission and/or reception unit 30 is also referred to as a transmitter, a receiver, a coding unit, a decoding unit, or a physical layer processing unit.

The higher layer processing unit 34 performs processing of the Medium Access Control (MAC) layer, the Packet Data Convergence Protocol (PDCP) layer, the Radio Link Control (RLC) layer, and the Radio Resource Control (RRC) layer.

The medium access control layer processing unit 35 included in the higher layer processing unit 34 performs processing of the medium access control layer. The medium access control layer processing unit 35 controls random access procedure in accordance with various types of configuration information/parameters managed by the radio resource control layer processing unit 36.

The radio resource control layer processing unit 36 included in the higher layer processing unit 34 performs processing of the radio resource control layer. The radio resource control layer processing unit 36 generates, or acquires from a higher node, downlink data (transport block) allocated on a physical downlink shared channel, system information, an RRC message, a MAC Control Element (CE), and the like, and performs output to the radio transmission and/or reception unit 30. The radio resource control layer processing unit 36 manages various types of configuration information/parameters for each of the terminal apparatuses 1. The radio resource control layer processing unit 36 may set various types of configuration information/parameters for each of the terminal apparatuses 1 via higher layer signaling. That is, the radio resource control layer processing unit 36 transmits/reports information for indicating various types of configuration information/parameters.

The functionality of the radio transmission and/or reception unit 30 is similar to the functionality of the radio transmission and/or reception unit 10, and hence description thereof is omitted.

Each of the units having the reference signs 10 to 16 included in the terminal apparatus 1 may be configured as a circuit. Each of the units having the reference signs 30 to 36 included in the base station apparatus 3 may be configured as a circuit. Each of the units that are included in the terminal apparatus 1 and have the reference signs 10 to 16 may be configured as at least one processor and a memory coupled to the at least one processor. Each of the units that are included in the base station apparatus 3 and have the reference signs 30 to 36 may be configured as at least one processor and a memory coupled to the at least one processor.

Hereinafter, a Radio Network Temporary Identifier (RNTI) will be described.

The CRC parity bits added to the downlink control information are scrambled with an RNTI. The terminal apparatus 1 may determine the format of the downlink control information, based on the RNTI. The terminal apparatus 1 may determine the usage of the downlink control information, based on the RNTI.

The RNTI may include at least a Cell RNTI (C-RNTI), a Temporary Cell RNTI (TC-RNTI), a Configured Scheduling RNTI (CS-RNTI), a Semi Persistent Channel State Information RNTI (SP-CSI-RNTI), and a Random Access RNTI (RA-RNTI).

The C-RNTI is used for dynamically scheduled unicast transmission (uplink and downlink). The TC-RNTI is used for message 3 transmission of a contention based random access procedure. The TC-RNTI is used for contention resolution in a case that a C-RNTI is not available.

The CS-RNTI is used for activation, deactivation, reactivation, and retransmission of the downlink Semi Persistent Scheduling (SPS). In a case that the downlink SPS is activated, the terminal apparatus 1 may consider that a downlink assignment is generated in a slot or an OFDM symbol satisfying a prescribed condition. Here, the slot or OFDM symbol satisfying the prescribed condition may be given based on at least the offset of the slot unit, the periodicity of the slot unit, the offset of the symbol unit, and/or the periodicity of the symbol unit. The downlink SPS will be described in NPL 5.

The CS-RNTI is used for activation, deactivation, reactivation, and retransmission of the configured grant type 2. The configured grant type 2 is one of the types of transmission without dynamic grant (configured grant without dynamic grant). The transmission without dynamic grant is uplink transmission. In a case that the configured grant type 2 is activated, the terminal apparatus 1 may consider that the uplink grant is generated in a slot or OFDM symbol satisfying a prescribed condition. Here, the slot or OFDM symbol satisfying the prescribed condition may be given based on at least the offset of the slot unit, the periodicity of the slot unit, the offset of the symbol unit, and/or the periodicity of the symbol unit.

The SP-CSI-RNTI is used at least used for activation, deactivation, and reactivation of the semi-persistent CSI report. In a case that the semi-persistent CSI report is activated, the terminal apparatus 1 may perform a semi-persistent CSI report in a slot or OFDM symbol satisfying a prescribed condition. Here, the slot or OFDM symbol satisfying the prescribed condition may be given based on at least the offset of the slot unit, the periodicity of the slot unit, the offset of the symbol unit, and/or the periodicity of the symbol unit. The semi-persistent CSI report may be transmitted on the PUCCH or the PUSCH.

The offset of the slot unit, the periodicity of the slot unit, the offset of the symbol unit, and the periodicity of the symbol unit may be individually configured for the downlink SPS, the configured grant type 2, and the semi-persistent CSI report.

The RA RNTI is used for a random access response.

A contention based random access procedure will be described below.

The contention based random access procedure includes a first step, a second step, a third step, and a fourth step.

In the first step, the terminal apparatus 1 transmits a random access preamble. The random access preamble is included in the PRACH. In the first step, the MAC layer of the terminal apparatus 1 itself may select the index of the random access preamble. In other words, in the first step, the base station apparatus 3 may not notify the terminal apparatus 1 of the index of the random access preamble.

In the second step, the terminal apparatus 1 receives a random access response. The random access response is included in the PDSCH. Here, the PDCCH for the RA-RNTI is used for scheduling of the PDSCH including the random access response. The value of RA-RNTI may be given based on a resource of the PRACH used for transmission of the random access preamble in the first step. The random access response includes a random access preamble identifier for indicating an index of the random access preamble, an uplink grant, and information for indicating the TC-RNTI, and information for indicating a timing advance. In a case that the random access response includes the random access preamble identifier corresponding to the random access preamble transmitted in the first step, the terminal apparatus 1 considers that the random access response has been successfully received.

In the third step, the terminal apparatus 1 transmits a Common Control Channel (CCCH) including an identifier of the terminal apparatus 1 or a MAC Control Element (CE) for indicating the C-RNTI. The CCCH is a logical channel. The CCCH or the MAC CE may be transmitted on the PUSCH scheduled by the uplink grant included in the random access response. A transport block including transmission of the CCCH or the MAC CE is also referred to as message 3.

In the fourth step, the terminal apparatus 1 receives a contention resolution. The contention resolution may be a UE contention resolution identity or a C-RNTI. In a case that the terminal apparatus 1 has transmitted the C-RNTI on the PUSCH of the third step and the terminal apparatus 1 has received the PDCCH for the C-RNTI, the terminal apparatus 1 may consider that the contention resolution has been successful and may consider that the random access procedure has been successfully completed.

The information for indicating the UE contention resolution identity is included in the PDSCH. Here, for the scheduling of the PDSCH, the PDCCH for the TC-RNTI is used. In a case that (i) the terminal apparatus 1 has not transmitted the C-RNTI on the PUSCH of the third step, (ii) the terminal apparatus 1 has transmitted the CCCH including an identifier of the terminal apparatus 1 in the third step, (iii) the terminal apparatus 1 receives the PDCCH for the TC-RNTI, (iv) the PDSCH scheduled by the PDCCH includes information for indicating the UE contention resolution identity, and (v) the UE contention resolution identity and the identifier of the terminal apparatus 1 transmitted in the third step match, the terminal apparatus 1 may consider that the contention resolution has been successful and may consider that the random access procedure has been successfully completed.

Hereinafter, a control resource set (CORESET) will be described.

Figure 6:
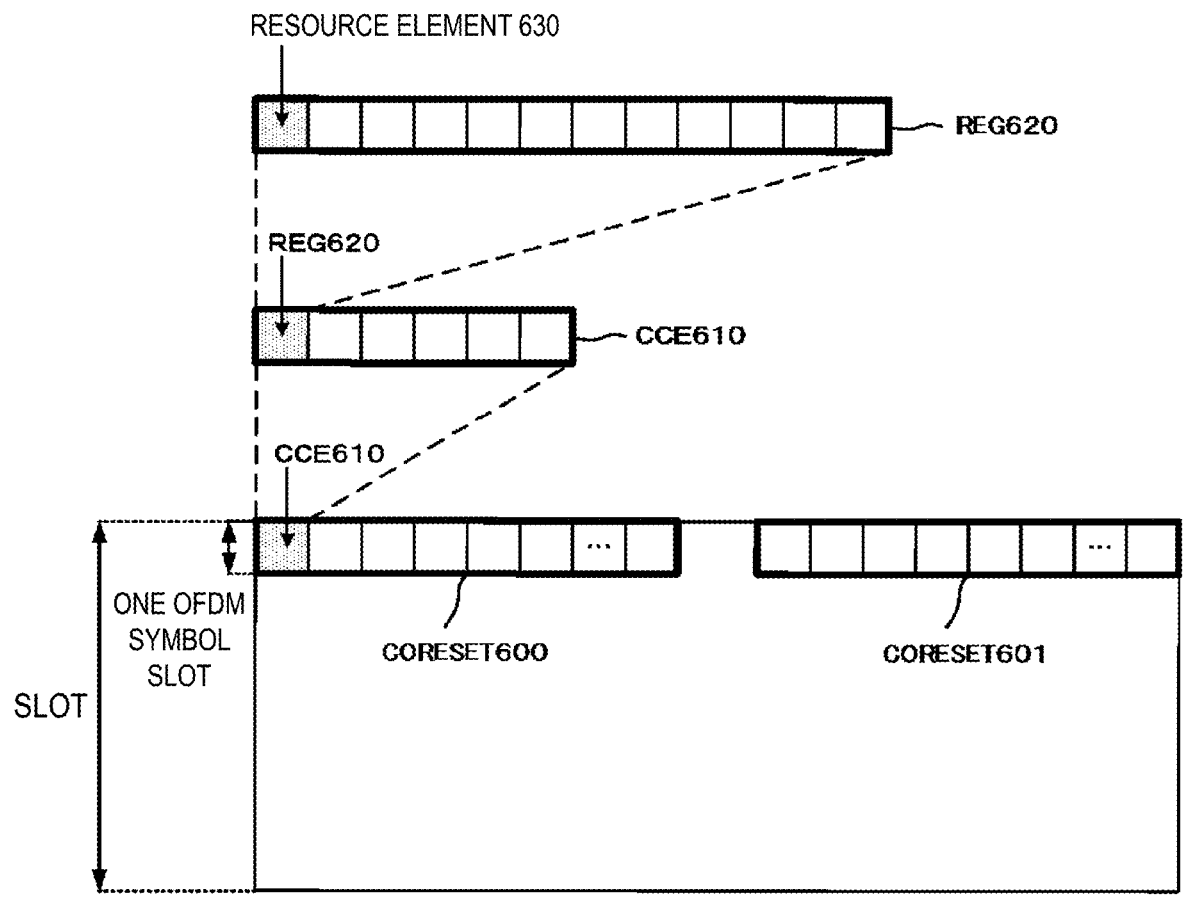
FIG. 6 is a diagram illustrating an example of a CORESET according to the present embodiment.

FIG. 6 is a diagram illustrating an example of a CORESET according to the present embodiment. 600 and 601 are CORESETs. 610 is a Control Channel Element (CCE). 620 is a Resource Element Group (REG). 630 is a resource element. A slot in the serving cell may include one or more CORESETs. In the time domain, a CORESET may be included in one or more continuous OFDM symbols. In the time domain, the CORESET may be included in the first OFDM symbol of the slot. The CORESET may include multiple resource elements in the frequency domain. The CORESET may include multiple CCEs. One CCE may include six continuous REGs in the frequency domain. One REG may include 12 continuous resource elements in the frequency domain. The CCE is an element that constitutes a PDCCH candidate.

Hereinafter, a search space will be described.

There are two types of search space. One of the types of search space is Common Search Space (CSS), and the other is UE-specific Search Space (USS).

Figure 7:
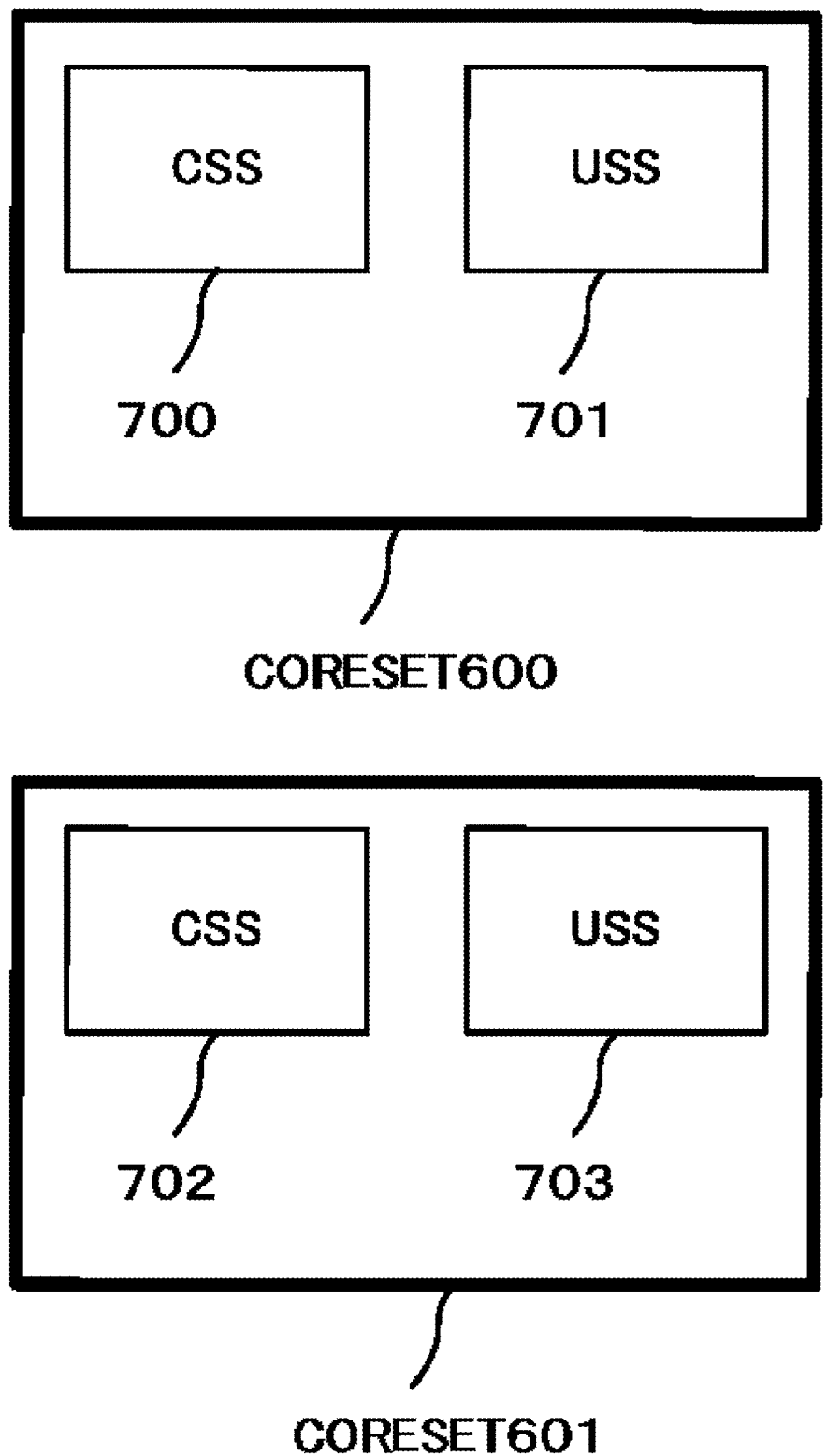
FIG. 7 is a diagram illustrating an example of mapping of a CORESET and search spaces according to the present embodiment.

FIG. 7 is a diagram illustrating an example of mapping of a CORESET and search spaces according to the present embodiment. A CORESET 600 includes a CSS 700 and a USS 701. A CORESET 601 includes a CSS 702 and a USS 703.

The index of the CORESET 600 may be 0. The CORESET 600 is also referred to as CORESET 0. The parameter RadioResourceConfigCommon may include at least a configuration for the CORESET 600, a configuration for the CSS 700, and/or a configuration for the USS 701. The parameter RadioResourceConfigCommon may be used to indicate a common radio resource configuration. The parameter RadioResourceConfigCommon may not indicate an index of the CORESET 600.

The index of CORESET 601 is not 0. The index of CORESET 601 may be any of 1 to 11. The parameter RadioResourceConfigDedicated may include at least a configuration for CORESET 1, a configuration for the CSS 702, and/or a configuration for the USS 703. The parameter RadioResourceConfigDedicated may be used to indicate the UE-specific physical channel configuration for the secondary cell. The parameter RadioResourceConfigDedicated may indicate an index of the CORESET 601.

The RRCConnectionReconfiguration message may include a parameter RadioResourceConfigCommon and a parameter RadioResourceConfigDedicated. The terminal apparatus 1 may receive the RRCConnectionReconfiguration message from the base station apparatus 3 or a base station apparatus different from the base station apparatus 3.

The search space is a set of PDCCH candidates. The PDCCH is transmitted in a PDCCH candidate. The terminal apparatus 1 monitors the PDCCH in the search space. The monitoring means an attempt to decode the PDCCH in accordance with a DCI format. The monitoring the PDCCH is also referred to as monitoring the DCI format. The PDCCH candidate may include one or multiple continuous CCEs in the CORESET. The number of CCEs constituting the PDCCH candidate is also referred to as an aggregation level. The search space may be defined for each aggregation level.

The terminal apparatus 1 may monitor the PDCCH with the DCI format with the CRC parity bits scrambled with the RA-RNTI in the CSS. The terminal apparatus 1 may monitor, in the CSS and the USS, the PDCCH with the DCI format with the CRC parity bits scrambled with the C-RNTI, the PDCCH with the DCI format with the CRC parity bits scrambled with the TC-RNTI, the PDCCH with the DCI format with the CRC parity bits scrambled with the CS-RNTI, and/or the PDCCH with the DCI format with the CRC parity bits scrambled with the SP-CSI-RNTI.

Figure 8:
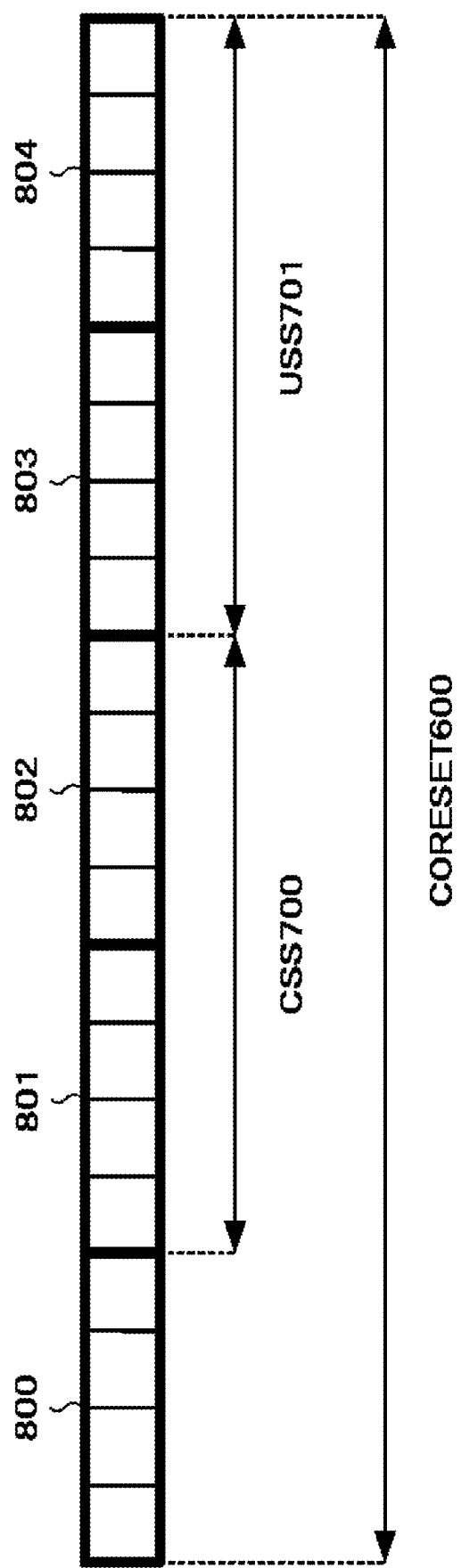
FIG. 8 is a diagram illustrating an example of search spaces in CORESET 600 according to the present embodiment.

FIG. 8 is a diagram illustrating an example of search spaces in CORESET 600 according to the present embodiment. Each of 800 to 804 is a PDCCH candidate of aggregation level 4. CSS 700 is a set of a PDCCH candidate 801 and a PDCCH candidate 802. USS 701 is a set of a PDCCH candidate 803 and a PDCCH candidate 804.

In the CORESET, the CCE corresponding to the $m_n$-th PDCCH candidate of the search space for the serving cell is given by Expression (1). The PDCCH candidate 801 is the first PDCCH candidate of the CSS 700. The PDCCH candidate 802 is the second PDCCH candidate of the CSS 700. The PDCCH candidate 803 is the first PDCCH candidate of the USS 701. The PDCCH candidate 804 is the second PDCCH candidate of the USS 701.

$$L \cdot \left[ \left\{ Y_{p,k_p} + \text{floor}\left(\frac{m_{nCI} \cdot N_{CCE,p}}{L \cdot M_{p,max}^{(L)}}\right) + nCI \right\} \right.$$

$$\left. \mod \text{floor}\left(\frac{N_{CCE,p}}{L}\right) \right] + i \quad \text{[Expression 1]}$$

where
for CSS, $Y_{p,k_p} = 0;$ for USS, $Y_{p,k_p} = (A_p \cdot Y_{p,k_p-1} \mod D, \ Y_{p,-1} = n_{RNTI} \neq 0,$ $A_0 = 39827, A_1 = 39829, A_2 = 39839,$ $D = 65537;$ $i = 0, \ldots, L-1$ $k_p$ is the slot number within the radio frame; $N_{CCE,p}$ is the number of CCEs, numbered from 0 to $N_{CCE,p}-1$, in CORESET p;

floor is a floor function. The floor function outputs the largest integer among integers smaller than the input value. X mod Y is a function to output a remainder in a case of dividing X by Y. L is the aggregation level. $k_p$ may be a slot number in the radio frame.

p is a CORESET number in Expression (1). The CORESET number p may be assigned in an ascending order of the index of the CORESET. For the CORESET 600 with the index 0, p may be 0. For the CORESET 601 with the index from 1 to 11, p may be 1. $N_{CCE,p}$ is the number of CCEs included in the CORESET p.

$Y_{p,k_p}$ corresponds to the CORESET p. For the CSS, $Y_{p,k_p}$ is 0. For the USS, $Y_{p,k_p}$ is given based at least on the $n_{RNTI}$. $n_{RNTI}$ is a C-RNTI or a TC-RNTI. The USS given in a case that the $n_{RNTI}$ is set to the C-RNTI is also referred to as the USS given by the C-RNTI. The USS given in a case that the $n_{RNTI}$ is set to the TC-RNTI is also referred to as the USS given by the TC-RNTI.

$A_p$ corresponds to the CORESET p (p=0, 1, 2).

The terminal apparatus 1 may monitor, in the USS given by the C-RNTI, the PDCCH with the DCI format with the CRC parity bits scrambled with the C-RNTI, the PDCCH with the DCI format with the CRC parity bits scrambled with the CS-RNTI, and the PDCCH with the DCI format with the CRC parity bits scrambled with the SP-CSI-RNTI. The terminal apparatus 1 may monitor, in the USS given by the TC-RNTI, the PDCCH with the DCI format with the CRC parity bits scrambled with the TC-RNTI.

nCI is a value of the carrier indication field. In a case that no carrier indication field is configured, the nCI may be 0. According to the present embodiment, the nCI may be 0. $m_{nCI}$ is a PDCCH candidate number in the search space corresponding to the nCI. $M_{p,max}^{(L)}$ is the maximum value of $M_{p,nCI}^{(L)}$ for the aggregation level L. $M_{p,nCI}^{(L)}$ is the number of PDCCH candidates for the aggregation level L corresponding to n. $M_{p,nCI}^{(L)}$ for the CORESET 600 is 2. $M_{p,nCI}^{(L)}$ for the CORESET 601 is 2.

Figure 9:
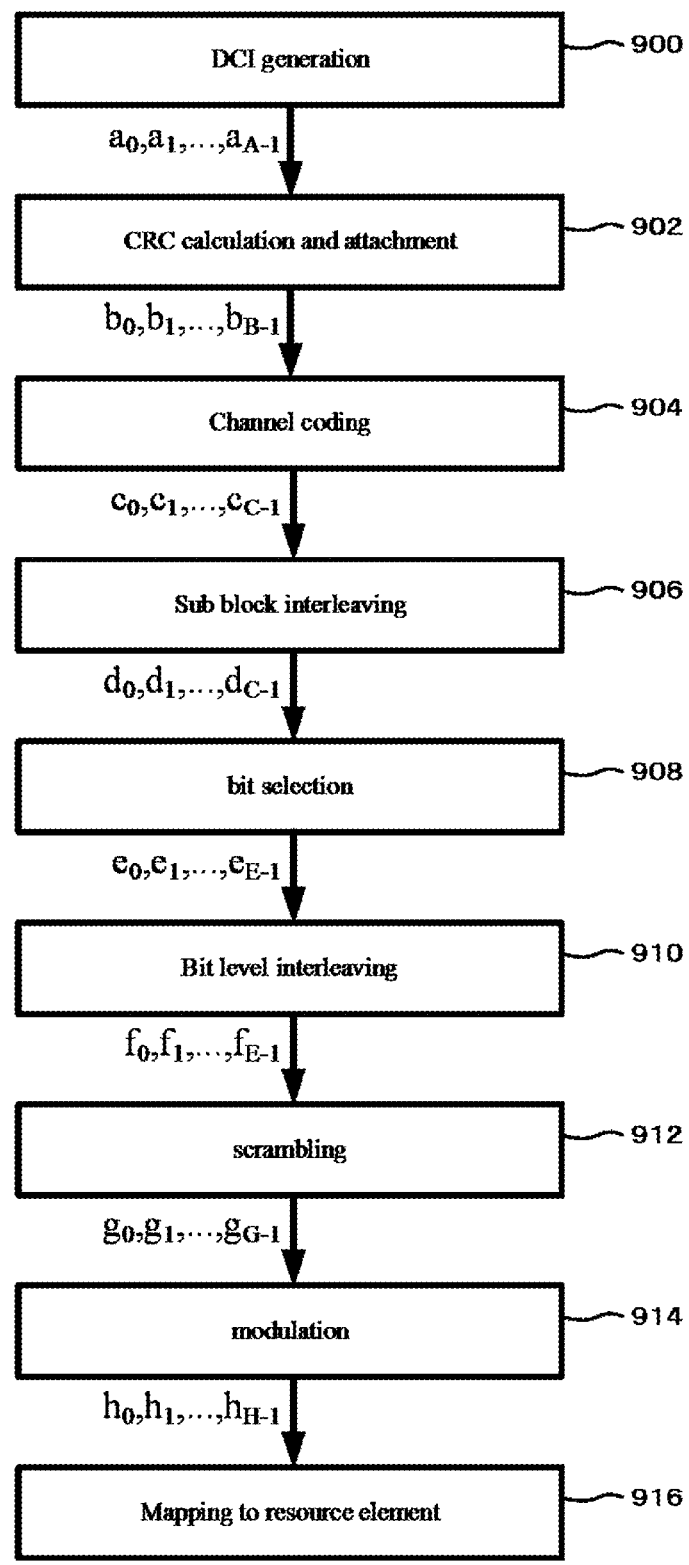
FIG. 9 is a diagram illustrating an example of processing related to downlink control information according to the present embodiment.

FIG. 9 is a diagram illustrating an example of processing related to downlink control information according to the present embodiment. The base station apparatus 3 may perform some or all of the processing from 900 to 916, based on the aggregation level of the PDCCH used for transmission of the downlink control information $a_i$.

In 900, the base station apparatus 3 generates the downlink control information $a_i$. A is the number of bits of the downlink control information.

In 902, the base station apparatus 3 generates CRC parity bits from the downlink control information $a_i$, and generates the bit sequence $b_i$ by adding the CRC parity bits to the downlink control information $a_i$. B is the sum of the number of CRC parity bits and A.

In 904, the base station apparatus 3 generates the coded bit $c_i$ by performing channel coding on the bit sequence $b_i$. The channel coding may be a polar coding or a convolutional coding. C is the number of bits of channel coding. For the base station apparatus 3, the coded bit $c_i$ may be given by a product of a matrix u' and a matrix G'. The matrix G' is a matrix of C rows and C columns, and may be given by the n-th Kronecker power of the two rows and two columns matrix Go. Matrix $u' = [u_0, u_1, \ldots, u_{C-1}]$ is a matrix of one row and C columns, and is generated based on the bit sequence $b_i$.

In 906, the base station apparatus 3 may generate the sequence $d_i$ by interleaving the sequence $c_i$.

In 908, the base station apparatus 3 may generate the sequence $e_i$ by repeating or punching the sequence $d_i$.

In 910, the base station apparatus 3 may generate the sequence $f_i$ by interleaving the sequence $e_i$.

In 912, the base station apparatus 3 may generate the sequence gi by scrambling the sequence $f_i$ by using the scrambling sequence si for the PDCCH.

In 914, the base station apparatus 3 generates the sequence hi of the modulation symbol (complex-valued symbol) from the sequence gi. In 916, the base station apparatus 3 maps the modulation symbol hi to a resource element corresponding to the PDCCH candidate.

The terminal apparatus 1 assumes processing from 900 to 914, and monitors the PDCCH. For example, the terminal apparatus 1 may assume that the sequence $f_i$ has been scrambled by using the scrambling sequence si for the PDCCH, and may monitor the PDCCH.

The radio transmission and/or reception unit 30 configured to generate the scrambling sequence si for the PDCCH may be initialized at least by using $c_{init}$. $c_{init}$ may be given based at least on the $N_L$, $N_{RNTI}$, and/or $N_{ID}$. $c_{init}$ may be given based on Expression (2) or Expression (3). In other words, the scrambling sequence si for the PDCCH may be given based at least on the $N_L$, $N_{RNTI}$, and/or $N_{ID}$.

$c_{init} = (N_{RNTI} \cdot 2^{16} + N_L \cdot 2^{15} + N_{ID}) \mod 2^{31}$ [EXPRESSION 2]

$c_{init} = (N_{RNTI} \cdot 2^{16} + N_{ID}) \mod 2^{31}$ [EXPRESSION 3]

For the CSS, the $N_{RNTI}$ may a be prescribed value. In other words, the PDCCH mapped to the CSS may be scrambled with the scrambling sequence si generated based at least on the $N_{RNTI}$ set to a prescribed value. Here, the prescribed value may be 0.

For the USS, the $N_{RNTI}$ may be given based on the RNTI by which the USS to which the PDCCH is mapped is given. The terminal apparatus 1 may determine the $N_{RNTI}$ based on the RNTI by which the USS to which the PDCCH is mapped is given.

For the USS given by the C-RNTI, the $N_{RNTI}$ may be the C-RNTI. In other words, the PDCCH mapped to the USS given by the C-RNTI may be scrambled with the scrambling sequence si generated based at least on the $N_{RNTI}$ set to the C-RNTI.

For the USS given by the TC-RNTI, the $N_{RNTI}$ may be the TC-RNTI or a predetermined value. Here, the predetermined value may be any of 0, 65534, and 65535. The predetermined value may be a different value from 0, 65534, and 65535. In other words, the PDCCH mapped to the USS given by the TC-RNTI may be scrambled with the scrambling sequence si generated based at least on the TC-RNTI or the $N_{RNTI}$ set to a predetermined value.

Regardless of the RNTI to be used for scrambling the CRC parity bits added to the downlink control information for the CSS, the $N_{RNTI}$ may be a prescribed value. Here, the prescribed value may be 0.

For the USS, the $N_{RNTI}$ may be given based at least on the RNTI to be used for scrambling the CRC parity bits added to the downlink control information. The terminal apparatus 1 may determine the $N_{RNTI}$, based at least on the RNTI to be used for scrambling the CRC parity bits added to the downlink control information.

In a case that the PDCCH is mapped to the USS and the CRC parity bits added to the downlink control information are scrambled with the C-RNTI, the SP-CSI-RNTI, or the CS-RNTI, the $N_{RNTI}$ may be the C-RNTI. In a case that the PDCCH is mapped to the USS and the CRC parity bits added to the downlink control information are scrambled with an RNTI other than the TC-RNTI, the $N_{RNTI}$ may be the C-RNTI. In a case that the PDCCH is mapped to the USS and the CRC parity bits added to the downlink control information are scrambled with the TC-RNTI, the $N_{RNTI}$ may be a predetermined value. Here, the predetermined value may be any of 0, 65534, and 65535. The predetermined value may be a different value from 0, 65534, and 65535.

For the PDCCH of the first aggregation level, $N_L$ may be set to 0. For the PDCCH of the second aggregation level, $N_L$ may be set to 1. The first aggregation level may include at least 1, 2, 4, and 8. The second aggregation level may include at least 16.

The $N_{ID}$ may be set to a higher layer parameter Control-scrambling-Identity or a physical layer cell ID (physical layer cell identity).

The higher layer parameter Control-scrambling-Identity may be configured for each CORESET or for each search space. The higher layer parameter Control-scrambling-Identity, the higher layer parameter Control-scrambling-Identity may be included in the parameter RadioResourceConfigDedicated.

The terminal apparatus 1 may acquire, by the cell search, the physical layer cell ID from the synchronization signal. The parameter RadioResourceConfigCommon may include a parameter for indicating the physical layer cell ID.

The $N_{ID}$ may be set based on whether or not the higher layer parameter Control-scrambling-Identity is configured for the terminal apparatus 1.

In a case that the higher layer parameter Control-scrambling-Identity is configured for the terminal apparatus 1, the $N_{ID}$ may be set based on the higher layer parameter Control-scrambling-Identity. In a case that the higher layer parameter Control-scrambling-Identity is not configured for the terminal apparatus 1, the $N_{ID}$ may be set to the physical layer cell ID.

The $N_{ID}$ may be set based on whether or not the higher layer parameter Control-scrambling-Identity is configured for the CORESET to which the PDCCH corresponds.

In a case that the higher layer parameter Control-scrambling-Identity is configured for the CORESET to which the PDCCH corresponds, the $N_{ID}$ may be set based on the higher layer parameter Control-scrambling-Identity. In a case that the higher layer parameter Control-scrambling-Identity is not configured for the CORESET to which the PDCCH corresponds, the $N_{ID}$ may be set to the physical layer cell ID.

The $N_{ID}$ may be set based on whether or not the higher layer parameter Control-scrambling-Identity is configured for the search space to which the PDCCH is mapped.

In a case that the higher layer parameter Control-scrambling-Identity is configured for the search space to which the PDCCH is mapped, the $N_{ID}$ may be set based on the higher layer parameter Control-scrambling-Identity. In a case that the higher layer parameter Control-scrambling-Identity is not configured for the search space to which the PDCCH is mapped, the $N_{ID}$ may be set to the physical layer cell ID. Here, the search space to which the PDCCH is mapped is the CSS or the USS.

The $N_{ID}$ may be set based on the RNTI to be used for scrambling the CRC parity bits added to the downlink control information.

In a case that the higher layer parameter Control-scrambling-Identity is configured for the terminal apparatus, and the CRC parity bits added to the downlink control information are scrambled with the C-RNTI, the $N_{ID}$ may be set based on the higher layer parameter Control-scrambling-Identity. In a case that the higher layer parameter Control-scrambling-Identity is configured for the terminal apparatus, and the CRC parity bits added to the downlink control information are scrambled with an RNTI other than C-RNTI, the $N_{ID}$ may be set to the physical layer cell ID. In a case that the higher layer parameter Control-scrambling-Identity is not configured for the terminal apparatus, the $N_{ID}$ may be set to the physical layer cell ID.

In a case that the higher layer parameter Control-scrambling-Identity is configured for the CORESET to which the PDCCH corresponds, and the CRC parity bits added to the downlink control information are scrambled with the C-RNTI, the $N_{ID}$ may be set based on the higher layer parameter Control-scrambling-Identity. In a case that the higher layer parameter Control-scrambling-Identity is configured for the CORESET to which the PDCCH corresponds, and the CRC parity bits added to the downlink control information are scrambled with an RNTI other than the C-RNTI, the $N_{ID}$ may be set to the physical layer cell ID. In a case that the higher layer parameter Control-scrambling-Identity is not configured for the CORESET to which the PDCCH corresponds, regardless of which RNTI is used for the CRC parity bits added to the downlink control information, the $N_{ID}$ may be set to the physical layer cell ID.

In a case that the higher layer parameter Control-scrambling-Identity is configured for the search space to which the PDCCH is mapped, and the CRC parity bits added to the downlink control information are scrambled with the C-RNTI, the $N_{ID}$ may be set based on the higher layer parameter Control-scrambling-Identity. In a case that the higher layer parameter Control-scrambling-Identity is configured for the search space to which the PDCCH is mapped, and the CRC parity bits added to the downlink control information are scrambled with an RNTI other than the C-RNTI, the $N_{ID}$ may be set to the physical layer cell ID. In a case that the higher layer parameter Control-scrambling-Identity is not configured for the search space to which the PDCCH is mapped, regardless of which RNTI is used for the CRC parity bits added to the downlink control information, the $N_{ID}$ may be set to the physical layer cell ID.

The $N_{ID}$ may be set based at least on the CORESET to which the PDCCH corresponds. The $N_{ID}$ may be set based at least on whether or not the PDCCH corresponds to CORESET 0.

In a case that the higher layer parameter Control-scrambling-Identity is configured for the terminal apparatus, and the PDCCH corresponds to a CORESET other than CORE- SET 0, the $N_{ID}$ may be set based on the higher layer parameter Control-scrambling-Identity. In a case that the higher layer parameter Control-scrambling-Identity is configured for the terminal apparatus, and the PDCCH corresponds to CORESET 0, the $N_{ID}$ may be set to the physical layer cell ID. In a case that the higher layer parameter Control-scrambling-Identity is not configured for the terminal apparatus, regardless of the CORESET to which the PDCCH corresponds, the $N_{ID}$ may be set to the physical layer cell ID.

The $N_{ID}$ may be set based at least on the search space to which the PDCCH is mapped.

In a case that the higher layer parameter Control-scrambling-Identity is configured for the terminal apparatus, and the PDCCH is mapped to the USS given by the C-RNTI, the $N_{ID}$ may be set based on the higher layer parameter Control-scrambling-Identity. In a case that the higher layer parameter Control-scrambling-Identity is configured for the terminal apparatus, and the PDCCH is mapped to the USS given by the TC-RNTI, the $N_{ID}$ may be set to the physical layer cell ID. In a case that the higher layer parameter Control-scrambling-Identity is configured for the terminal apparatus, and the PDCCH is mapped to the CSS, the $N_{ID}$ may be set to the physical layer cell ID. In a case that the higher layer parameter Control-scrambling-Identity is not configured for the terminal apparatus, regardless of the search space to which the PDCCH is mapped, the $N_{ID}$ may be set to the physical layer cell ID.

In a case that the higher layer parameter Control-scrambling-Identity is configured for the CORESET to which the PDCCH corresponds, and the PDCCH is mapped to the USS given by the C-RNTI, the $N_{ID}$ may be set based on the higher layer parameter Control-scrambling-Identity. In a case that the higher layer parameter Control-scrambling-Identity is configured for the CORESET to which the PDCCH corresponds, and the PDCCH is mapped to the USS given by the TC-RNTI, the $N_{ID}$ may be set to the physical layer cell ID. In a case that the higher layer parameter Control-scrambling-Identity is configured for the CORESET to which the PDCCH corresponds, and the PDCCH is mapped to the CSS, the $N_{ID}$ may be set to the physical layer cell ID. In a case that the higher layer parameter Control-scrambling-Identity is not configured for the CORESET to which the PDCCH corresponds, regardless of the search space to which the PDCCH is mapped, the $N_{ID}$ may be set to the physical layer cell ID.

The $N_{ID}$ may be set based at least on the CORESET to which the PDCCH corresponds and the search space to which the PDCCH corresponds. The $N_{ID}$ may be set based at least on whether or not the PDCCH corresponds to the CSS of the CORESET with the index of 0.

In a case that the higher layer parameter Control-scrambling-Identity is configured for the terminal apparatus, and the PDCCH corresponds to a search space other than the CSS of the CORESET with the index of 0, the $N_{ID}$ may be set based on the higher layer parameter Control-scrambling-Identity. Here, the search space other than the CSS of the CORESET with the index of 0 may be the USS of the CORESET with the index of 0, the CSS of the CORESET other than the CORESET with the index of 0, and the USS of the CORESET other than the CORESET with the index of 0. In a case that the higher layer parameter Control-scrambling-Identity is configured for the terminal apparatus, and the PDCCH corresponds to the CSS of the CORESET with the index of 0, the $N_{ID}$ may be set to the physical layer cell ID. In a case that the higher layer parameter Control-scrambling-Identity is not configured for the terminal apparatus, regardless of the CORESET to which the PDCCH corresponds and the search space to which the PDCCH corresponds, the $N_{ID}$ may be set to the physical layer cell ID.

The $N_{ID}$ may be set based at least on the $N_{RNTI}$.

In a case that the higher layer parameter Control-scrambling-Identity is configured for the terminal apparatus, and the $N_{RNTI}$ is given based at least on the C-RNTI, the $N_{ID}$ may be set based on the higher layer parameter Control-scrambling-Identity. In a case that the higher layer parameter Control-scrambling-Identity is configured for the terminal apparatus, and the $N_{RNTI}$ is given regardless of the C-RNTI, the $N_{ID}$ may be set to the physical layer cell ID. Here, the $N_{RNTI}$ given regardless of the C-RNTI may be that the $N_{RNTI}$ is given by the TC-RNTI and/or that the $N_{RNTI}$ is a predetermined value. In a case that the higher layer parameter Control-scrambling-Identity is configured for the terminal apparatus, and the $N_{RNTI}$ is a value of the TC-RNTI or a predetermined value, the $N_{ID}$ may be set to the physical layer cell ID. Here, the predetermined value may be any of 0, 65534, and 65535. The predetermined value may be a different value from 0, 65534, and 65535. In a case that the higher layer parameter Control-scrambling-Identity is not configured for the terminal apparatus, regardless of the $N_{RNTI}$, the $N_{ID}$ may be set to the physical layer cell ID.

The $N_{ID}$ may be determined based at least on some or all of the above-mentioned conditions.

Hereinafter, various aspects of the terminal apparatus 1 and the base station apparatus 3 according to the present embodiment will be described.

(1) A first aspect of the present embodiment is a terminal apparatus 1 including: a receiver 10 configured to receive a PDCCH including downlink control information; and a decoding unit 10 configured to decode the downlink control information, wherein a sequence of coded bits of the downlink control information is scrambled with a scrambling sequence si, the scrambling sequence si is initialized based at least on $N_{RNTI}$, and in a case that the PDCCH is mapped to a CSS, the $N_{RNTI}$ is a first prescribed value, and in a case that the PDCCH is mapped to a USS, the $N_{RNTI}$ is given based at least on an RNTI by which the USS is given.

(2) A second aspect of the present embodiment is a terminal apparatus 1 including: a receiver 10 configured to receive a PDCCH including downlink control information; and a decoding unit 10 configured to decode the downlink control information, wherein the sequence of coded bits of the downlink control information is scrambled with a scrambling sequence si, the scrambling sequence si is initialized based at least on $N_{RNTI}$, and in a case that the PDCCH is mapped to a CSS, regardless of RNTI to be used for scrambling CRC parity bits added to the downlink control information, the $N_{RNTI}$ is a first prescribed value, and in a case that the PDCCH is mapped to a USS, the $N_{RNTI}$ is given based at least on the RNTI to be used for scrambling the CRC parity bits added to the downlink control information.

(3) A third aspect of the present embodiment is a base station apparatus 3 including: a coding unit 30 configured to encode downlink control information; and a transmitter 30 configured to transmit a PDCCH including the downlink control information, wherein a sequence of coded bits of the downlink control information is scrambled with a scrambling sequence, the scrambling sequence is initialized based at least on $N_{RNTI}$, and in a case that the PDCCH is mapped to a CSS, the $N_{RNTI}$ is a first prescribed value, and in a case that the PDCCH is mapped to a USS, the $N_{RNTI}$ is given based at least on an RNTI by which the USS is given.

(4) A fourth aspect of the present embodiment is a base station apparatus 3 configured to encode downlink control information and transmit a PDCCH including the downlink control information, wherein a sequence of coded bits of the downlink control information is scrambled with a scrambling sequence, the scrambling sequence is initialized based at least on $N_{RNTI}$, and in a case that the PDCCH is mapped to a CSS, regardless of an RNTI to be used for scrambling CRC parity bits added to the downlink control information, the $N_{RNTI}$ is a first prescribed value, and in a case that the PDCCH is mapped to a USS, the $N_{RNTI}$ is given based at least on the RNTI to be used for scrambling the CRC parity bits added to the downlink control information.

(5) In the first and third aspects of the present embodiment, in a case that the PDCCH is mapped to the USS given by a C-RNTI, the $N_{RNTI}$ is the C-RNTI, and in a case that the PDCCH is mapped to the USS given by a TC-RNTI, the $N_{RNTI}$ is a second prescribed value, and the second prescribed value is any one of the TC-RNTI, 0, 65534, and 65535. In the first and third aspects of the present embodiment, in a case that the USS is given by a C-RNTI, the $N_{RNTI}$ may be the C-RNTI, and the USS is given by a TC-RNTI, the $N_{RNTI}$ may be a second prescribed value.

(6) In the second and fourth aspects of the present embodiment, in a case that the PDCCH is mapped to the USS and the CRC parity bits added to the downlink control information are scrambled with an RNTI other than a TC-RNTI, the $N_{RNTI}$ is a C-RNTI, and in a case that the PDCCH is mapped to the USS and the CRC parity bits added to the downlink control information are scrambled with the TC-RNTI, the $N_{RNTI}$ is a second prescribed value, and the second prescribed value is any one of the first prescribed value, the TC-RNTI, 0, 65534, and 65535.

This allows the terminal apparatus 1 and the base station apparatus 3 to efficiently perform communication in the downlink.

Each of a program running on a base station apparatus 3 and a terminal apparatus 1 according to the present invention may be a program that controls a Central Processing Unit (CPU) and the like, such that the program causes a computer to operate in such a manner as to realize the functions of the above-described embodiment according to the present invention. The information handled in these devices is temporarily stored in a Random Access Memory (RAM) while being processed. Thereafter, the information is stored in various types of Read Only Memory (ROM) such as a Flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. A "computer-readable recording medium" refers to a portable medium such as a flexible disk, a magneto-optical disk, a ROM, a CD-ROM, and the like, and a storage device such as a hard disk built into the computer system.

The "computer-readable recording medium" may include a medium that dynamically retains a program for a short period of time, such as a communication line in a case that the program is transmitted over a network such as the Internet or over a communication line such as a telephone line, and may also include a medium that retains the program for a fixed period of time, such as a volatile memory included in the computer system functioning as a server or a client in such a case. The above-described program may be one for realizing some of the above-described functions, and also may be one capable of realizing the above-described functions in combination with a program already recorded in a computer system.

The base station apparatus 3 according to the above-described embodiment may be achieved as an aggregation (apparatus group) including multiple apparatuses. Each of the apparatuses constituting such an apparatus group may include some or all portions of each function or each functional block of the base station apparatus 3 according to the above-described embodiment. The apparatus group needs to have a complete set of functions or functional blocks of the base station apparatus 3. The terminal apparatus 1 according to the above-described embodiment can also communicate with the base station apparatus as the aggregation.

The base station apparatus 3 according to the above-described embodiment may serve as an Evolved Universal Terrestrial Radio Access Network (EUTRAN). The base station apparatus 3 according to the above-described embodiment may have some or all of the functions of a node higher than an eNodeB.

Some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. A circuit integration technique is not limited to the LSI, and may be realized with a dedicated circuit or a general-purpose processor. In a case that with advances in semiconductor technology, a circuit integration technology with which an LSI is replaced appears, it is also possible to use an integrated circuit based on the technology.

According to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. A configuration in which constituent elements, described in the respective embodiments and having mutually the same effects, are substituted for one another is also included in the technical scope of the present invention.

The invention claimed is:

1. A terminal device comprising:
reception circuitry configured to and/or programmed to receive a sequence of bits on a physical downlink control channel; and
decoding circuitry configured to and/or programmed to decode the sequence of bits, wherein
the sequence of bits is scrambled by a scrambling sequence initialized by a $c_{init}$,
the $C_{inti}$ is given at least based on a $N_{ID}$ and a $N_{RNTI}$,
the $N_{ID}$ is set at least based on a higher layer parameter in a case that the higher layer parameter is configured and the $N_{RNTI}$ is given at least based on a cell radio network temporary identifier (C-RNTI), and
the $N_{ID}$ is set at least based on a physical layer cell identity in a case that the higher layer parameter is configured and the $N_{RNTI}$ is not given based on the C-RNTI.

2. A base station device comprising:
transmission circuitry configured to and/or programmed to transmit a sequence of bits on a physical downlink control channel; and
coding circuitry configured to and/or programmed to code the sequence of bits, wherein
the sequence of bits is scrambled by a scrambling sequence initialized by a $c_{init}$,
the $C_{inti}$; is given at least based on a $N_{ID}$ and a $N_{RNTI}$,
the $N_{ID}$ is set at least based on a higher layer parameter in a case that the higher layer parameter is configured and the $N_{RNTI}$ is given at least based on a cell radio network temporary identifier (C-RNTI), and
the $N_{ID}$ is set at least based on a physical layer cell identity in a case that the higher layer parameter is configured and the $N_{RNTI}$ is not given based on the C-RNTI.

3. A communication method used by a terminal device, the communication method comprising:
receiving a sequence of bits on a physical downlink control channel; and
decoding the sequence of bits, wherein
the sequence of bits is scrambled by a scrambling sequence initialized by a $c_{init}$,
the $C_{inti}$; is given at least based on a $N_{ID}$ and a $N_{RNTI}$,
the $N_{ID}$ is set at least based on a higher layer parameter in a case that the higher layer parameter is configured and the $N_{RNTI}$ is given at least based on a cell radio network temporary identifier (C-RNTI), and
the $N_{ID}$ is set at least based on a physical layer cell identity in a case that the higher layer parameter is configured and the $N_{RNTI}$ is not given based on the C-RNTI.

4. A communication method used by a base station device, the communication method comprising:
coding a sequence of bits; and
transmitting the sequence of bits on a physical downlink control channel, wherein
the sequence of bits is scrambled by a scrambling sequence initialized by a $c_{init}$,
the $C_{inti}$; is given at least based on a $N_{ID}$ and a $N_{RNTI}$,
the $N_{ID}$ is set at least based on a higher layer parameter in a case that the higher layer parameter is configured and the $N_{RNTI}$ is given at least based on a cell radio network temporary identifier (C-RNTI), and
the $N_{ID}$ is set at least based on a physical layer cell identity in a case that the higher layer parameter is configured and the $N_{RNTI}$ is not given based on the C-RNTI.

* * * * *